United States Patent
Ogura et al.

[11] Patent Number: 5,900,622
[45] Date of Patent: * May 4, 1999

[54] PHOTOELECTRIC CONVERSION APPARATUS AND INFORMATION PROCESSING APPARATUS

[75] Inventors: Makoto Ogura, Isehara; Tatsundo Kawai, Hadano; Toshihiro Saika, Zama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/548,947

[22] Filed: Oct. 27, 1995

[30] Foreign Application Priority Data

Oct. 28, 1994 [JP] Japan .................................. 6-265059

[51] Int. Cl.⁶ ............................ H01L 27/14; H04N 1/031
[52] U.S. Cl. ........................ 250/208.1; 250/234; 250/239; 358/482; 358/496
[58] Field of Search ............................ 250/208.1, 208.2, 250/208.3, 214.1, 214 R, 234, 235, 236, 239; 358/471, 474, 475, 476, 480, 482, 483, 484, 494, 493, 496, 497, 498

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 |
| 4,463,359 | 7/1984 | Ayata et al. | 346/1.1 |
| 4,558,333 | 12/1985 | Sugitani et al. | 346/140 |
| 4,680,644 | 7/1987 | Shirato et al. | 358/294 |
| 4,723,129 | 2/1988 | Endo et al. | 346/1.1 |
| 4,740,796 | 4/1988 | Endo et al. | 346/1.1 |
| 4,791,493 | 12/1988 | Ogura et al. | 358/294 |
| 4,839,730 | 6/1989 | Shirakoshi et al. | 358/294 |
| 4,920,431 | 4/1990 | Ogura et al. | 358/496 |
| 5,101,285 | 3/1992 | Kawai et al. | 358/471 |
| 5,105,238 | 4/1992 | Nikaido et al. | 357/19 |
| 5,196,691 | 3/1993 | Kitani et al. | 250/208.1 |
| 5,233,178 | 8/1993 | Tokunaga | 250/208.1 |
| 5,254,847 | 10/1993 | Hata et al. | 250/208.1 |
| 5,272,548 | 12/1993 | Kawai et al. | 358/482 |
| 5,331,146 | 7/1994 | Tanimizu | 250/208.1 |
| 5,352,883 | 10/1994 | Kitani et al. | 250/208.1 |
| 5,489,992 | 2/1996 | Endo | 358/482 |
| 5,526,141 | 6/1996 | Ogura et al. | 358/496 |

FOREIGN PATENT DOCUMENTS

| | | |
|---|---|---|
| 0420644 | 4/1991 | European Pat. Off. . |
| 0508709 | 10/1992 | European Pat. Off. . |
| 0557891 | 9/1993 | European Pat. Off. . |
| 3716809 | 11/1987 | Germany . |
| 59-123670 | 7/1984 | Japan . |
| 59-138461 | 8/1984 | Japan . |
| 2255684 | 11/1992 | United Kingdom . |

*Primary Examiner*—Edward P. Westin
*Assistant Examiner*—John R. Lee
*Attorney, Agent, or Firm*—Fitzpatrick, Cella, Harper & Scinto

[57] ABSTRACT

A photoelectric conversion apparatus is constructed in such an arrangement that a light-source substrate, in which a light source is arranged, and a photosensor are directly mounted on a frame bearing the strength of the main body of an information processing apparatus, the above light-source substrate may be unified with an electric circuit substrate of the information processing apparatus, and the electric circuit substrate has the photosensor and the light source, whereby the size and weight of the apparatus can be further decreased, the freedom of design and engineering design can be improved, and simplification of assembling and improvement in reliability can be achieved.

44 Claims, 11 Drawing Sheets

PHOTOELECTRIC CONVERSION APPARATUS AND INFORMATION PROCESSING APPARATUS

BACKGROUND OF THE INVENTION

1. Field of the Invention

The present invention relates to photoelectric conversion apparatus and information processing apparatus, and more particularly to photoelectric conversion apparatus suitably applicable to input portions in facsimile devices, image readers, scanners, copiers, electronic blackboards, etc., which are information processing apparatus for reading image information while relatively moving the original or the like subjected to image reading in close contact on a primary line sensor, and the information processing apparatus therewith.

2. Related Background Art

Recently, in order to further decrease the size or further enhance the performance as to information processing apparatuses such as facsimile devices, image readers, etc., elongate line sensors that can be used in a 1:1 optical system have been developed as photoelectric conversion apparatuses for information processing apparatuses. In order to further decrease the size and the cost, photoelectric conversion apparatus and information processing apparatus have been developed for directly detecting reflected light from the original by a sensor without using a 1:1 fiber lens array but through a transparent spacer of glass or the like.

FIG. 1 is a diagrammatic, perspective view of a conventional photoelectric conversion apparatus, and FIG. 2 is a diagrammatic cross section thereof when the photoelectric conversion apparatus is cut along 2—2 in FIG. 1. In FIG. 1 and FIG. 2, reference numeral 1 designates a photosensor, 101 a sensor substrate, 102 photoelectric conversion elements, 103 a wiring part, 104 a mount plate, and 105 a transparent protection layer.

As shown in FIG. 1 and FIG. 2, a plurality of photoelectric conversion elements 102 are arranged in line on the sensor substrate 101, and the transparent protection layer 105 comprised of a thin glass plate or the like is provided on the photoelectric conversion elements 102 in order to protect the photoelectric conversion elements 102 and to act as a spacer between the photoelectric conversion elements 102 and the original Output signals from the photoelectric conversion elements 102 are arranged as capable of being output to the outside through the wiring part 103. These sensor substrate 101, photoelectric conversion elements 102, wiring part 103, and transparent protection layer 105 are incorporated with the mount plate 104, thus composing the photoelectric conversion apparatus 1. The mount plate 104 is made of an easily-moldable material such as a resin, and is molded except for an optically transparent portion of the member.

The structure of a photoelectric conversion element used in such a photoelectric conversion apparatus is next explained briefly referring to FIG. 3.

FIG. 3 is a diagrammatic cross section for illustrating an example of the photoelectric conversion element. In FIG. 3, reference numeral 170 is a substrate, 171 a light-shielding layer, for example, of aluminum or chromium, 172 an insulator layer, for example, of silicon nitride, 173 a semiconductor layer, for example, of i-type amorphous silicon, 174 an ohmic contact layer, for example, of n⁺-type non-single-crystal silicon, 175 an electrode layer, for example, of aluminum, 176 a passivation layer, for example, of silicon nitride or polyimide, and 177 an adhesive layer, for example, of an epoxy resin.

As shown in FIG. 3, the sensor substrate 101 has a photoelectric conversion element having the light-shielding layer 171 provided on the substrate 170 in correspondence to a photoelectric conversion portion so as to prevent illumination light from the substrate side from entering the photoelectric conversion portion, the insulator layer 172 provided on the light-shielding layer 171, the semiconductor layer 173 provided on the insulator layer, and the electrode layer 175 provided through the ohmic contact layer 174 above the semiconductor layer with a space for an incident area of light, and the passivation layer 176 provided on the photoelectric conversion element; and the transparent protection layer 105 is provided through the adhesive layer 177 above the sensor substrate 101.

Light L emitted from a light source (not shown) passes through the sensor substrate 101, adhesive layer 177, and transparent protection layer 105 to reach the original P, and reflected light from the original P is incident to the space formed in the electrode layer 175 to be photoelectrically converted according to the incidence of light.

FIG. 4 is a diagrammatic, sectional, structural drawing for illustrating an example of a facsimile device with a communication function as an example of the information processing apparatus having the above photoelectric conversion apparatus.

In FIG. 4, reference numeral 180 denotes the facsimile device, 181 a feed roller, 182 a separator pawl, 183 a conveying roller, 184 a system control substrate, 185 a platen roller, 186 a recording head, 187 a power supply section, 188 the photoelectric conversion apparatus, 189 an operation panel, P the original, and W a recording medium.

As shown in FIG. 4, the facsimile device 180 supplies the original P to an image reading section by the feed roller 181 when the original P is inserted thereinto. In the original reading section the photoelectric conversion apparatus 188 is disposed and the original P is conveyed as urged against the reading portion by the conveying roller 183 opposed to the photoelectric conversion apparatus 188. This urging is effected by an urging device such as a spring, not shown. As urging the conveying roller 183 and/or the photoelectric conversion apparatus 188 against each other, the original P conveyed to between the conveying roller 183 and the photoelectric conversion apparatus 188 is further conveyed in a discharge direction. The separator pawl 182 is used for separating and feeding the originals P set in a pile one by one.

Further, the facsimile device 180 has the recording head 186 for recording an image received or information read by the above photoelectric conversion apparatus 188 in a recording medium W, and the platen roller 185 for conveying the recording medium W for recording information by the recording head 186.

The power supply 187 is a power-supply portion for driving the facsimile device 180, the system controller 184 is provided for controlling an image reading means including the photoelectric conversion apparatus 188 and the recording means including the recording head 186, and the operation panel 189 is a so-called control portion of the facsimile device 180.

The photoelectric conversion apparatus 188 is mounted, as shown, to a frame 4 (a main body frame in the drawing) provided in the facsimile device 180. This frame is normally provided in order to attain mainly the strength of the apparatus main body.

FIG. 5 is a diagrammatic, structural drawing for illustrating a mounting portion of the photoelectric conversion apparatus 188 and surroundings thereof.

In FIG. 5, reference numeral 191 represents a light source such as light-emitting diodes, 192 a sensor frame, 193 a light-source substrate, and 194 a connector. For using the light-emitting diodes as a light source 191, a plurality of light-emitting diodes are arranged at intervals on the light-source substrate 193. The photosensor 1 and light-source substrate 193 are mounted to the sensor frame 192 so as to be incorporated therewith, thereby composing the photoelectric conversion apparatus 188. The connector 194 is provided for supplying the power for driving the photoelectric conversion elements or the light-emitting diodes and/or for outputting electric signals carrying information output from the photoelectric conversion elements.

The photoelectric conversion apparatus 188 is mounted by unrepresented means in a recess formed in the frame 4.

FIG. 6 is a diagrammatic, perspective assembly drawing for illustrating the mounting portion of the photoelectric conversion apparatus 188 and surroundings thereof In FIG. 6, reference numeral 195 stands for a flexible board for outputting signals from the photosensor 1, 196 a flexible board for outputting the signals from the photoelectric conversion apparatus 188 to the outside, and 197 an electric connection portion in FIG. 7 to be connected with the flexible board.

As shown in FIG. 6, the photoelectric conversion apparatus 188 is arranged so as to be dropped into the recess formed in the frame 4, and the flexible board 196 is connected to the electric connection portion on the apparatus body side, thereby electrically being connected with the apparatus body. The conveying roller 183 is disposed above the reading portion of the photoelectric conversion apparatus 188, as described above. The signal line from the photosensor 1 is first electrically connected through the flexible board 195 to the light-source substrate 193 and then electrically connected through a signal processing circuit provided in the light-source substrate 193 and through the flexible board 196 to a processing circuit on the apparatus body side.

FIG. 7 is a diagrammatic, structural drawing for illustrating an example of the connection relation between the photoelectric conversion apparatus 188 and the system control substrate 184 in the facsimile device 180.

As shown in FIG. 7, the flexible board 196 from the photoelectric conversion apparatus 188 is electrically connected with the connector 197 formed in the system control substrate 184.

However, with attempt to achieve further reductions of cost, size, and weight for the information processing apparatus constructed in the above structure, there was virtually no room for further reductions of cost, size, and weight, because the photoelectric conversion apparatus is constructed in a unit structure using the sensor frame. Another problem was that the limits of further reductions of size and weight would impose restrictions on freedom of engineering design of the apparatus main body or freedom of design thereof.

SUMMARY OF THE INVENTION

The present invention has been accomplished in view of the above problems, and an object of the present invention is to provide photoelectric conversion apparatus and information processing apparatus having achieved further reductions of cost, size, and weight.

Another object of the present invention is to provide photoelectric conversion apparatus and information processing apparatus enhanced in freedom of engineering design and in freedom of design.

A further object of the present invention is to provide an information processing apparatus comprising: a photoelectric conversion apparatus having a substrate in which a light source is arranged, and a photosensor having a plurality of photoelectric conversion elements disposed on an optically transparent substrate, an optically transparent protection layer disposed on the photoelectric conversion elements, and a mounting member, which has a projecting portion to be joined with the substrate in which the light source is arranged, on the side of the substrate in which the light source is arranged, and which unifies the optically transparent substrate with the optically transparent protection layer; a frame for the photoelectric conversion apparatus to be set thereon; conveying means for conveying the original; and a controller for controlling at least the light source, photoelectric conversion elements, and conveying means.

Still another object of the present invention is to provide an information processing apparatus comprising a substrate in which a light source is arranged; a photosensor having a plurality of photoelectric conversion elements disposed on an optically transparent substrate and an optically transparent protection layer disposed on the photoelectric conversion elements; a frame for the substrate and the photosensor to be set thereon; conveying means for conveying the original; and a controller for controlling at least the light source, photoelectric conversion elements, and conveying means.

A still further object of the present invention is to provide a photoelectric conversion apparatus comprising a substrate in which a light source is arranged; and a photosensor having a plurality of photoelectric conversion elements disposed on an optically transparent substrate, an optically transparent protection layer disposed on the photoelectric conversion elements, and a mounting member, which has a projecting portion to be joined with the substrate in which the light source is arranged, on the side of the substrate in which the light source is arranged, and which unifies the optically transparent substrate with the optically transparent protection layer.

DETAILED DESCRIPTION OF THE PREFERRED EMBODIMENTS

Figure 1:
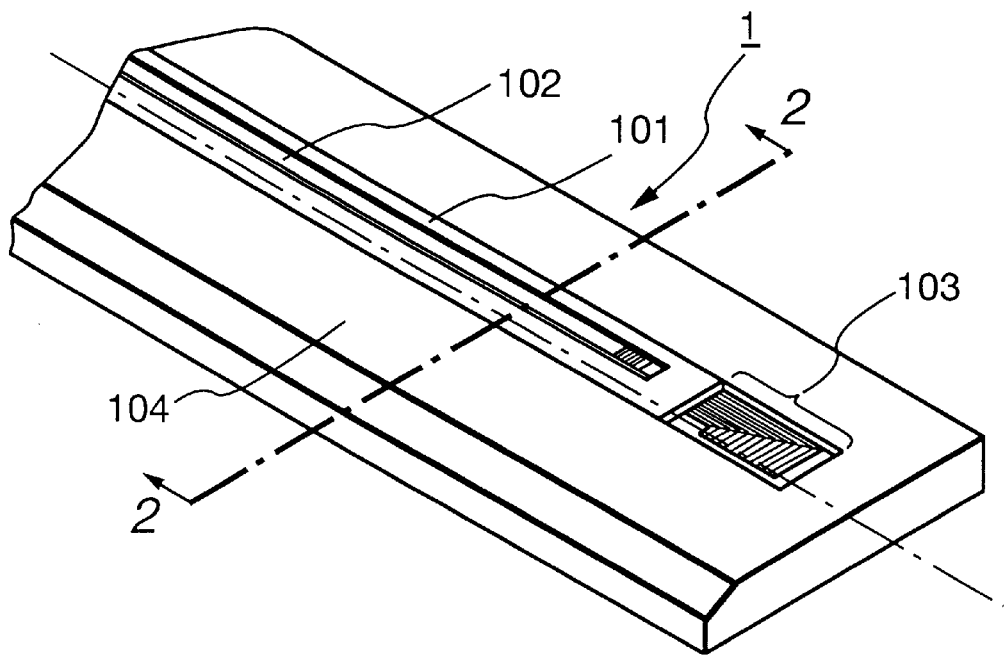
FIG. 1 is a diagrammatic, perspective view for illustrating an example of the photoelectric conversion apparatus.
Figure 2:
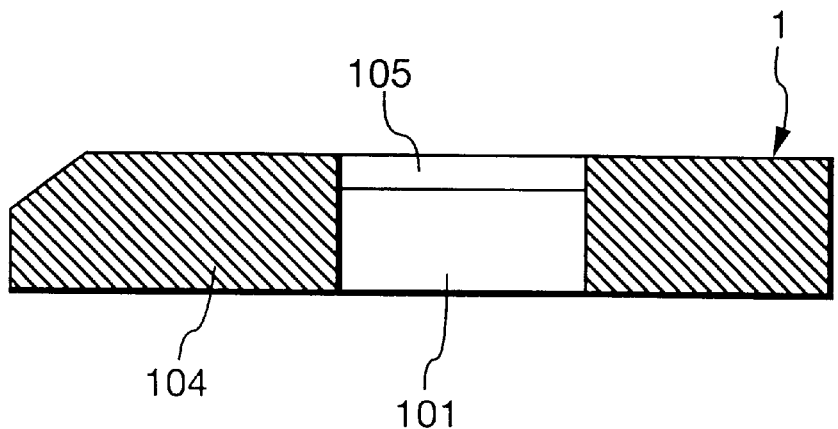
FIG. 2 is a diagrammatic, sectional view of the photoelectric conversion apparatus shown in FIG. 1.
Figure 3:
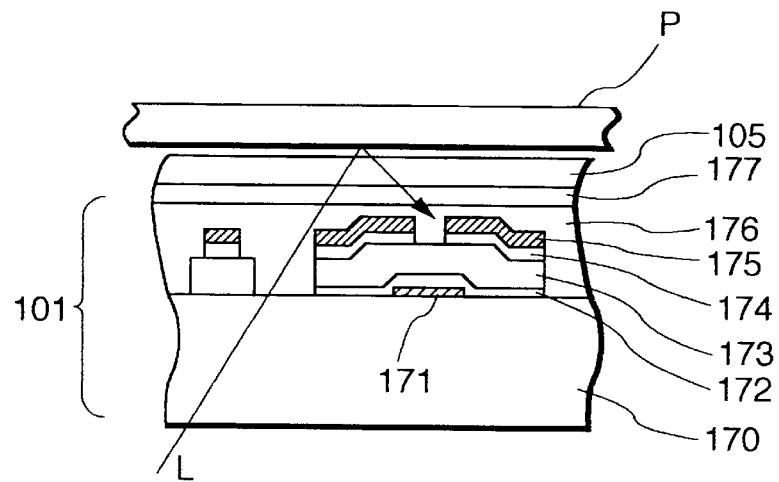
FIG. 3 is a diagrammatic, sectional view for illustrating an example of the photoelectric conversion element.
Figure 4:
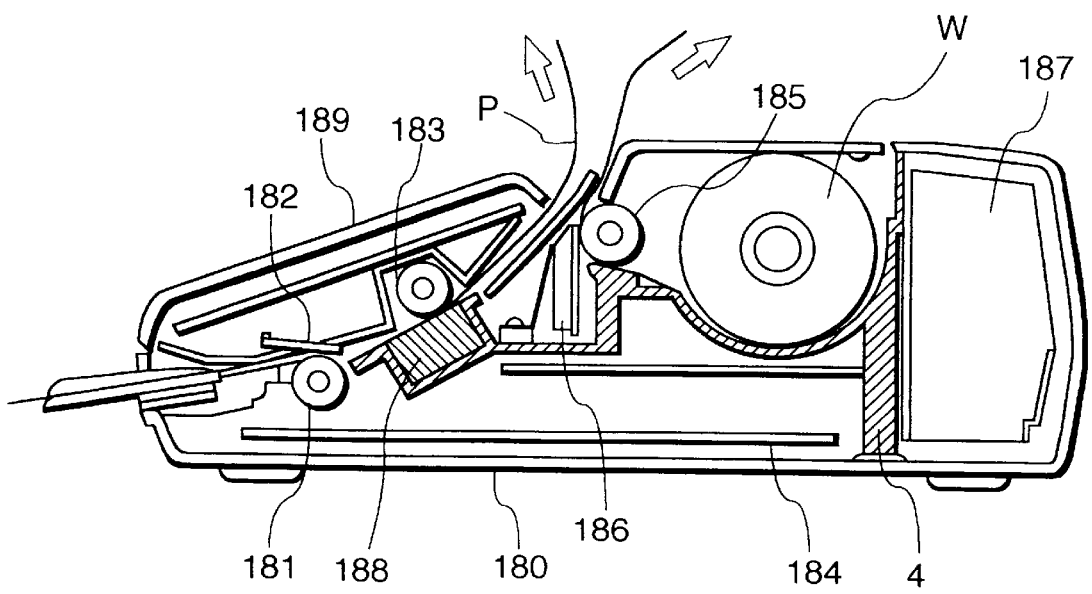
FIG. 4 is a diagrammatic, sectional, structural drawing for illustrating an example of the information processing apparatus having the photoelectric conversion apparatus.
Figure 5:
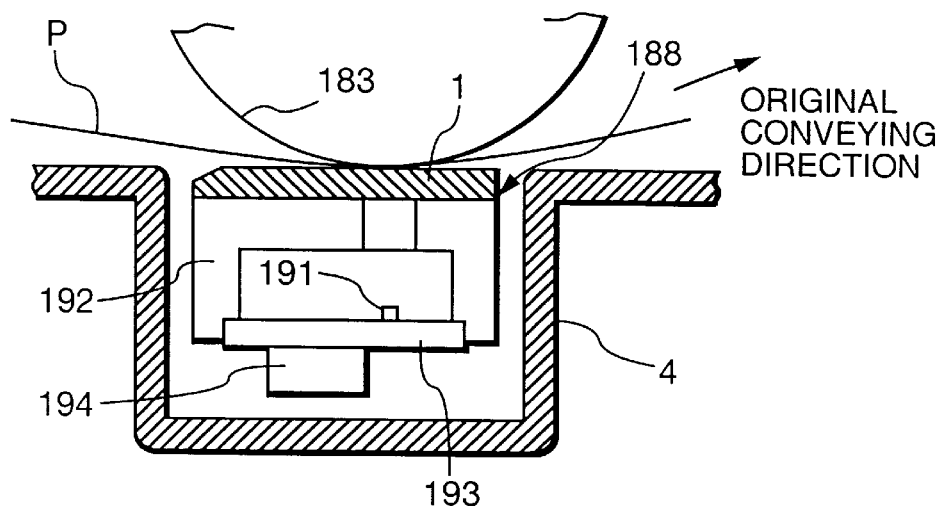
FIG. 5 is a diagrammatic, structural drawing for illustrating an example of the mounting portion of the photoelectric conversion apparatus and surroundings thereof.
Figure 6:
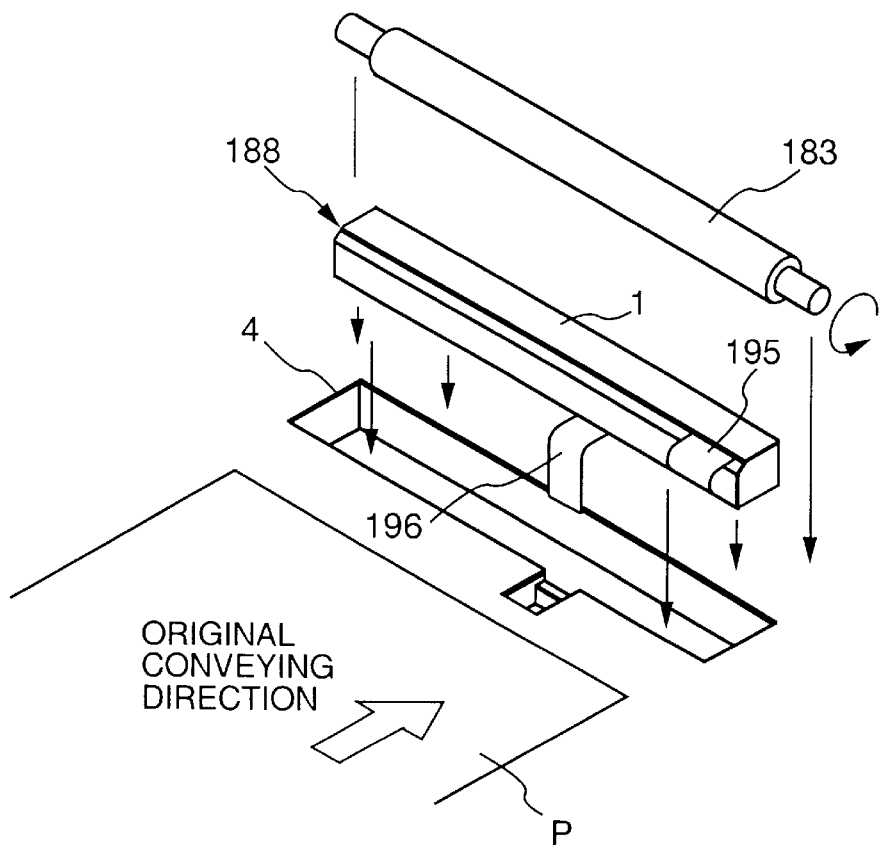
FIG. 6 is a diagrammatic, perspective, assembly drawing for illustrating an example of the mounting portion of the photoelectric conversion apparatus and surroundings thereof.
Figure 7:
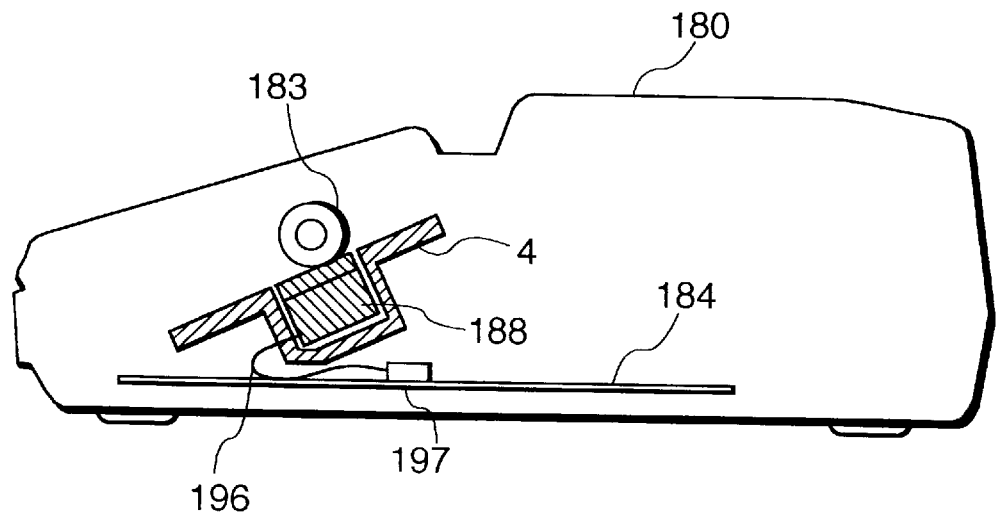
FIG. 7 is a diagrammatic, structural drawing for illustrating an example of the electrical connection relation in a facsimile device.

The above problems have been overcome by an information processing apparatus comprising: a photoelectric conversion apparatus having a substrate in which a light source is arranged, and a photosensor having a plurality of photoelectric conversion elements disposed on an optically transparent substrate, an optically transparent protection layer disposed on the photoelectric conversion elements, and a mounting member, which has a projecting portion to be joined with the substrate in which the light source is arranged, on the side of the substrate in which the light source is arranged, and which unifies the optically transparent substrate with the optically transparent protection layer; a frame for the photoelectric conversion apparatus to be set thereon; conveying means for conveying the original; and a controller for controlling at least the light source, photoelectric conversion elements, and conveying means.

The above problems have also been overcome by an information processing apparatus comprising a substrate in which a light source is arranged; a photosensor having a plurality of photoelectric conversion elements disposed on an optically transparent substrate and an optically transparent protection layer disposed on the photoelectric conversion elements; a frame for the substrate and the photosensor to be set thereon; conveying means for conveying the original; and a controller for controlling at least the light source, photoelectric conversion elements, and conveying means.

Further, the above problems have also been overcome by a photoelectric conversion apparatus comprising a substrate in which a light source is arranged; and a photosensor having a plurality of photoelectric conversion elements disposed on an optically transparent substrate, an optically transparent protection layer disposed on the photoelectric conversion elements, and a mounting member, which has a projecting portion to be joined with the substrate in which the light source is arranged, on the side of the substrate in which the light source is arranged, and which unifies the optically transparent substrate with the optically transparent protection layer.

Since the present invention excludes the sensor frame for constructing the photoelectric conversion apparatus, the apparatus can be reduced in size and weight by those of the sensor frame. Also, the number of components is decreased, thereby further decreasing the cost and further improving the reliability, and further enabling to have the freedom of design.

Further, mounting to the frame of the apparatus body can be done part by part like the photosensor and the light-source substrate, and thus, in case of necessity of part exchange arising, only one desired to change can be exchanged.

In addition, the present invention permits the light-source substrate to be unified with another electric circuit substrate, whereby the number of components can be decreased, and the reliability can be improved with decreases in numbers of assembling steps and wiring connections.

Further, the present invention obviates a need to use the sensor frame as a constituent member of the photosensor and to use an independent substrate for light source, whereby the length can be decreased between the reading surface side of the photosensor and the back side of the apparatus body below the electric circuit substrate such as the system control substrate, thereby achieving further reductions of size and weight.

The present invention can improve the position accuracy between the photosensor and the light source by fitting of the electric circuit substrate having the light source with the photosensor, and assembling becomes easier. Since adjustment in light quantity of the light source and adjustment in sensitivity of the sensor can be performed in such a state that the photosensor and the light source are mounted on the electric circuit substrate like the system control substrate, the adjustments are very easy and the total number of steps can be decreased, thereby further improving the work efficiency.

In the present invention press contact between the photosensor and the conveying roller can be achieved by providing urging means such as a spring on the conveying roller side, and, utilizing an elastic force of a member forming the frame, the elastic force of the frame can be utilized as an urging force toward the conveying roller. In this case, the number of components can be further decreased.

In addition, the present invention permits curvature or deformation of the electric circuit substrate like the system control substrate in which the photosensor is mounted, to be absorbed by providing the urging means for urging the photosensor toward the conveying roller, on the photosensor side, thereby achieving further-higher-resolution reading as well as the reductions of size and weight.

Also, balancing becomes easier by providing the urging means on the photosensor side than by providing the urging means on the conveying roller side, and it also facilitates prevention of oblique conveyance of original as effected by giving a greater pressure in the central portion of the conveying roller as compared with the other portions.

According to the embodiments presented, it is preferred to adjust the urging force so that the conveying force becomes stronger in the central portion in the longitudinal direction of the conveying roller 183 in order to prevent the oblique conveyance of original When the urging force is provided from the photosensor 1 side as in the embodiments presented, it can be achieved, for example, by increasing the thickness of the center spring. Thus, it becomes possible to solve the problem of oblique conveyance etc. by simple adjustment

EMBODIMENTS

The embodiments of the present invention will be explained by reference to the drawings.

Embodiment 1

Figure 8:
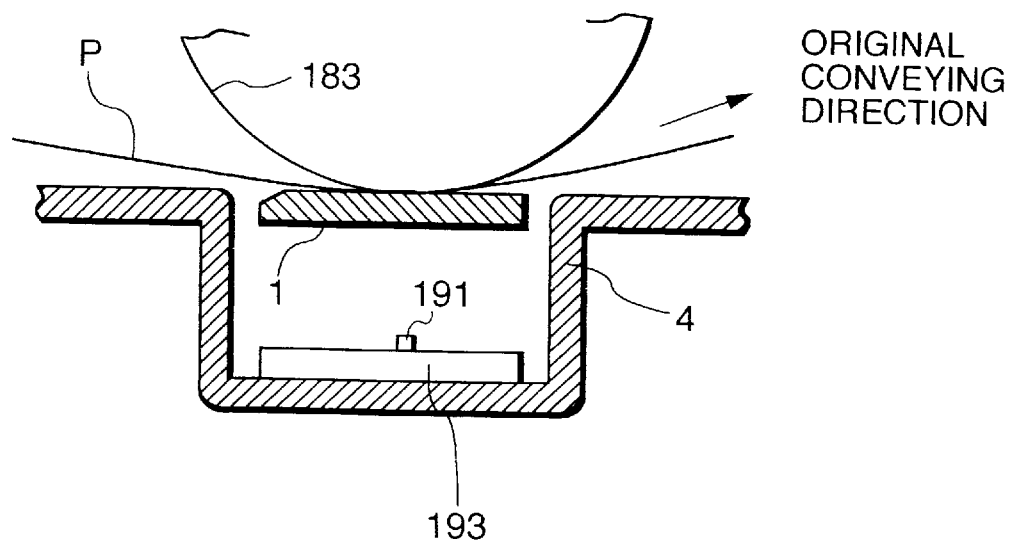
FIG. 8 is a diagrammatic, structural drawing for illustrating an example of a reading portion of an information processing apparatus of the present invention and surroundings thereof.
Figure 9:
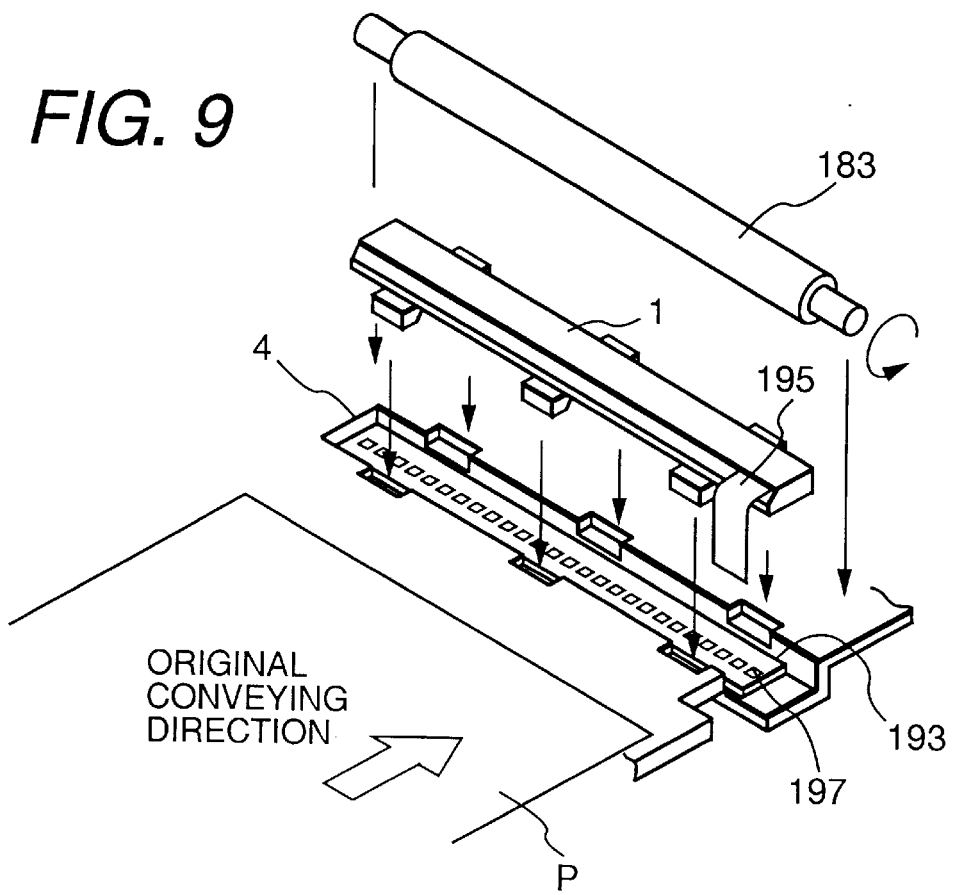
FIG. 9 is a diagrammatic, perspective, assembly drawing for illustrating an example of the reading portion of the information processing apparatus of the present invention and surroundings thereof.
Figure 10:
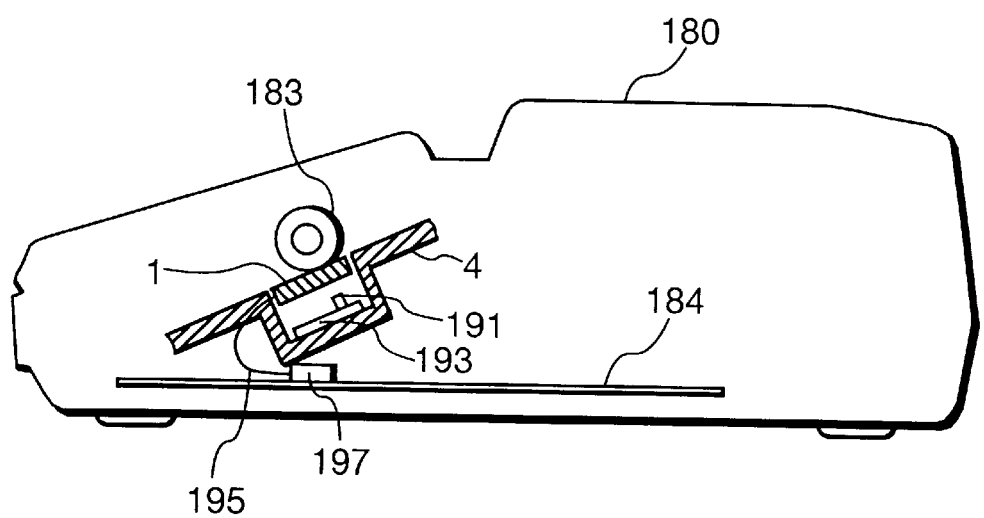
FIG. 10 is a diagrammatic, sectional, layout for illustrating an example of arrangement of the main body of the information processing apparatus.

FIG. 8 is a diagrammatic, structural drawing for illustrating a preferred example of the reading portion of the information processing apparatus of the present invention and surroundings thereof, FIG. 9 a diagrammatic, perspective, assembly drawing thereof, and FIG. 10 a drawing to show an example of layout in the apparatus body.

As shown in FIG. 8 to FIG. 10, the present embodiment shows a facsimile device 180 as an example of the information processing apparatus.

In the present embodiment the light-source substrate 193 in which light sources 191 are arranged at desired intervals is dropped into a recess portion formed in the frame 4. In detail, the light-source substrate 193 in which the light sources 191 are arranged is positioned and fixed on the bottom of the recess portion formed in the frame 4. The light sources 191 are electrically connected with a drive power supply through wiring such as an unrepresented connector or an unrepresented flexible board.

The frame in the present invention is a member which can be used to provide the strength of the main body of the information processing apparatus, and which can be used as a reference of positions or dimensions of various parts or which can be used for mounting the main constituent components thereto.

Simpler arrangement can be achieved by constructing the light-source substrate 193 in minimum patterns for drive of the light sources 191, and noise can be suppressed by placing a processing circuit for signals from the photosensor 1 on the side of the system control substrate, which can obviate a need to employ double-sided packaging for forming wiring and processing circuitry in the light-source substrate 193.

The light-source substrate 193 may be fixed to the frame 4 by a desired method, for example adhesion, mechanical fixing, etc. The fixing method by adhesion may include not only coating of an adhesive, but also adhesion by a double-sided adhesive tape. Further, the mechanical fixing may include snap fit, screwing, and a method of urging or pressing the substrate by hooklike fixing members or the like formed in parts of the frame 4. This fixing method may be any other method as long as desired fixing is effected, and thus, there is no specific restriction on the fixing method.

The photosensor 1 is mounted in the upper part of frame 4. In this case, it is preferred to position the mount position of the photosensor 1 by providing projecting portions, which become fitting portions for fitting between the mounting portion of the photosensor 1 and the frame 4, and portions (for example, cut portions) corresponding to the projecting portions, and letting them fit each other, as shown. In addition to the arrangement in which the projecting portions to become the fitting portions, and the portions corresponding to the projecting portions are formed with the projecting portions on the photosensor 1 side and the recessed portions corresponding to the projecting portions on the frame 4 side, as shown, another possible arrangement is such that the projecting portions are formed on the frame 4 side and the portions corresponding to the projecting portions on the photosensor 1 side, or still another possible arrangement is that the both photosensor 1 and frame 4 have the projecting portions and portions corresponding to the projecting portions opposed to each other. A further preferred arrangement is that a step is formed around the side surfaces of the aperture in the recess in the frame 4 and the periphery of the photosensor 1 is arranged to fit the step. Forming the projecting portions in the photosensor 1 is preferred, because they can reinforce the photosensor 1.

It is, however, noted that the positioning with fitting for the photosensor 1 is a preferred embodiment but is not indispensable.

The photosensor 1 may be fixed by adhesion fixing or mechanical fixing, or by the both. The fixing by adhesion is achieved by application of an adhesive, a so-called double-sided tape or the like in which an adhesive is applied on the both surfaces of a base material, or a combination thereof Any adhesive can be used herein as long as it does not damage the photosensor 1 or the frame 4. The mechanical fixing can be achieved by screwing, snap fit, press fixing, or any combination thereof. The press fixing can be achieved, for example, by sandwiching the photosensor 1 between a plate member and the frame 4. In this case, the plate member for pressing may be fixed to the frame 4 or another apparatus body by adhesion or mechanical fixing. An angle bar for example having an L-shaped cross section or another mounting means can be used for mechanical fixing irrespective of whether screwing, snap fit, or pressing is utilized.

The flexible board 195 extending from the photosensor 1 is electrically connected to an electrical connection portion 197 provided in the system control substrate 184.

The frame 4 is one of constituent members of the apparatus body. The frame 4 is formed by processing a metal plate by press working, combining metal plates, using a resin such as plastics, or any combination thereof. If the frame 4 is one formed by molding of a resin, it can be molded readily in a desired shape and can be formed in a complicated shape, thus being capable of achieving a further decrease in the number of components.

In the present embodiment, the recess formed in the frame 4 has the bottom formed in parallel with the position where the photosensor 1 is to be located, in order to set the light-source substrate 193 in parallel with the photosensor 1, but the surface of the bottom does not always have to be parallel with the position where the photosensor 1 is to be located. The point is that light emitted from the light sources 191 impinges upon the original and reflected light therefrom is incident to the photoelectric conversion elements. Nevertheless, a desired arrangement is that the light emitted from the light sources 191 efficiently illuminates the original and the reflected light from the original efficiently enters the photoelectric conversion elements. It becomes, however, possible to give more freedom of design by inclining the bottom of the recess in the frame 4 so as to permit inclined arrangement of the light-source substrate 193.

Since the present embodiment does not use the sensor frame to form the photoelectric conversion apparatus, the apparatus can be decreased in size and weight by those of the sensor frame. Further, since the apparatus is composed of a decreased number of components, the cost including the production cost can be decreased and the reliability can be further improved.

Additionally, because the photosensor 1 and the light-source substrate 193 can be mounted separately to the frame 4 of the apparatus body, in case of necessity of part exchange arising, only the part desired to change can be exchanged.

Embodiment 2

Figure 11:
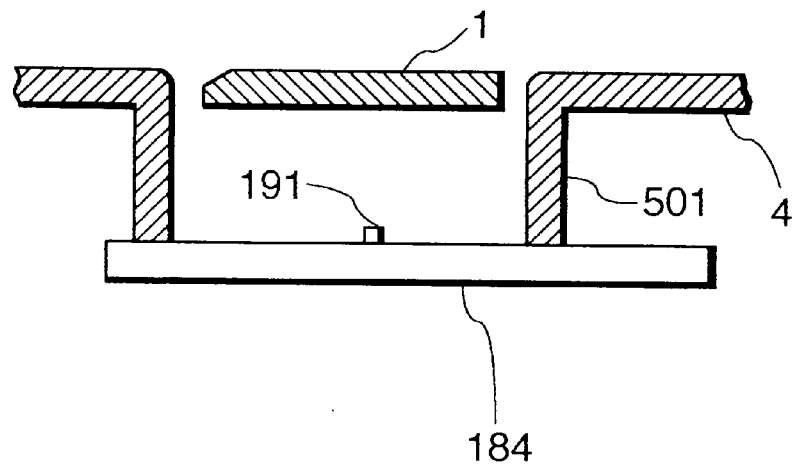
FIG. 11 is a diagrammatic, structural drawing for illustrating an example of the reading portion of the information processing apparatus of the present invention and surroundings thereof.
Figure 12:
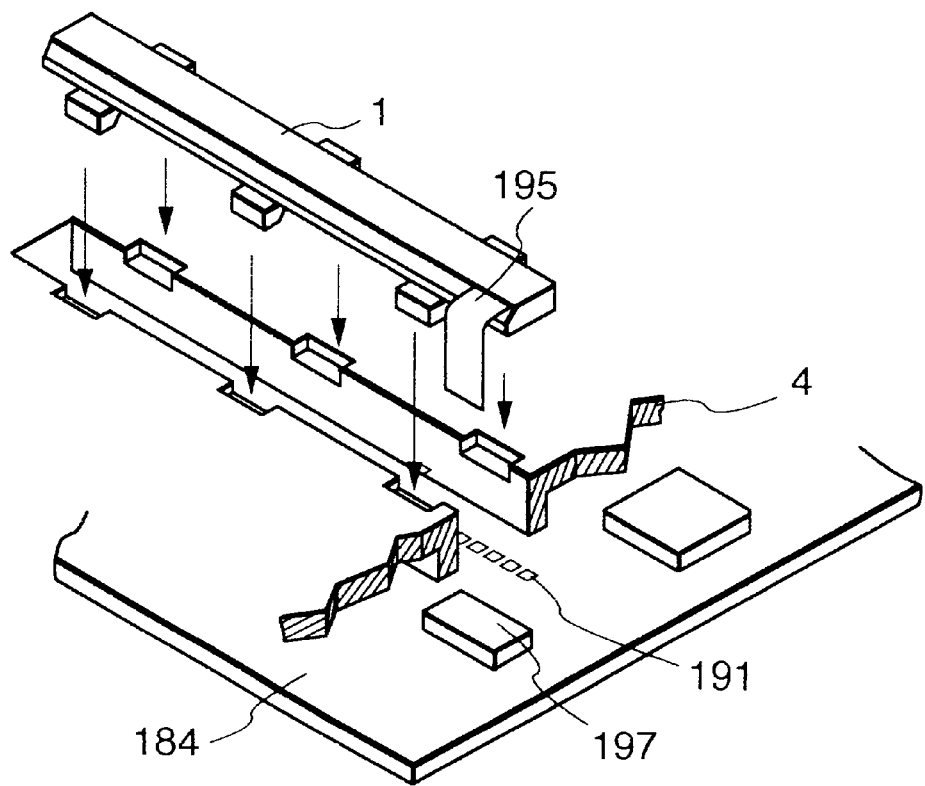
FIG. 12 is a diagrammatic, perspective, assembly drawing for illustrating an example of the reading portion of the information processing apparatus of the present invention and surroundings thereof.

FIG. 11 is a diagrammatic, structural drawing for illustrating another preferred example of the reading portion of the information processing apparatus of the present invention and surroundings thereof, and FIG. 12 a diagrammatic, perspective, assembly drawing thereof.

FIG. 11 and FIG. 12 show the example in which the light sources 191 are arranged directly on the system control substrate 184 which the apparatus body has, without using the independent light-source substrate, different from Embodiment 1. The system control substrate 184 is arranged to abut upon a part of the frame 4. This determines a distance between the light sources and the photosensor 1.

In more detail, in the case of the present embodiment, an aperture is formed in the frame 4, a framework 501 is formed as a projecting portion around the aperture, and the system control substrate 184 is made to abut on the framework 501. The light sources 191 are provided in the system control substrate 184, so that the system control substrate 184 can also serve as a light-source substrate.

The photosensor 1 is arranged to fit the frame 4 in the same manner as in Embodiment 1. The fitting between the photosensor 1 and the frame 4 is achieved by providing the photosensor 1 with projecting portions and forming cut portions in the frame 4 in correspondence to the projecting portions, as shown. Of course, the relation between the projections and cuts can be reversed; that is, the projections may be formed in the frame 4 and the cuts in the photosensor 1.

Also in the same manner as in the case of Embodiment 1, a step which the periphery of the photosensor 1 can fit may be formed around the aperture formed in the frame 4 so as to fit the entire photosensor 1.

The fixing of the photosensor 1 to the frame may be achieved by adhesion or mechanical method in the same manner as in Embodiment 1.

Coupling between the frame 4 and the system control substrate 184 may be achieved by adhesion or mechanical coupling, specifically by an adhesive, screws, snap fit or pressing, etc. These fixing methods each can be used alone, and of course, any combination with another method is very effective.

A further reinforcing member such as an L-shaped angle bar can be utilized for coupling between the frame 4 and the system control substrate 184.

In order to further enhance the mounting accuracy or in order to further improve the mounting strength, a preferred arrangement is such that projections are further formed in the lower part of the framework 501 of the frame 4, apertures are formed in the system control substrate 184 in correspondence to the projections, and those projections and apertures are made to fit each other.

In the present embodiment the lower edges of the framework 501 have equal lengths so that the system control substrate 184 can abut upon the photosensor 1 in parallel, but, as described in Embodiment 1, the lengths may be determined so as not to be equal, in order to incline the system control substrate 184 if necessary Further, the framework 501 does not necessarily have to be formed around the entire periphery of the aperture formed in the frame 4. A preferred example is that the framework 501 has two edges opposed to each other. However, to form the framework 501 around the entire periphery of the aperture is preferred also in respect of improving the stiffness of frame 4.

The material for forming the frame 4 can be one of those as explained in Embodiment 1.

The system control substrate 184 is a substrate which includes ICs for controlling an information processing system in the case of the present embodiment, for example IC for image processing and IC for drive control of the photoelectric conversion portion, or IC for drive control of the recording unit, etc. It is a matter of course that the present invention is by no means limited to such a substrate Namely, in the present invention, the substrate for the light sources to be arranged therein is united with the substrate having circuits arranged to achieve the other functions.

The unification of the system control substrate 184 with the light-source substrate can decrease not only the number of substrates as a whole in the apparatus body, but also the number of connectors for wiring connections or the number of electric connection points of soldering or the like, which can decrease the number of fabrication steps of the entire information processing apparatus. In addition, the decreases of connectors and electric connection points can enhance the reliability, which is thus preferred.

As explained above, the present embodiment can realize the reduction in the number of components by unifying the light-source substrate with the substrate for the other electric circuits and can improve the reliability with the decreases in the number of assembling steps and in the number of wiring connections.

The present embodiment does not need the sensor frame as a constituent member of the photosensor 1, and can shorten the distance from the reading surface side of the photosensor 1 to the back side of the apparatus body below the system control substrate 184 because it has no independent substrate for light sources, thus achieving further decreases of size and weight Embodiment 3

Figure 13:
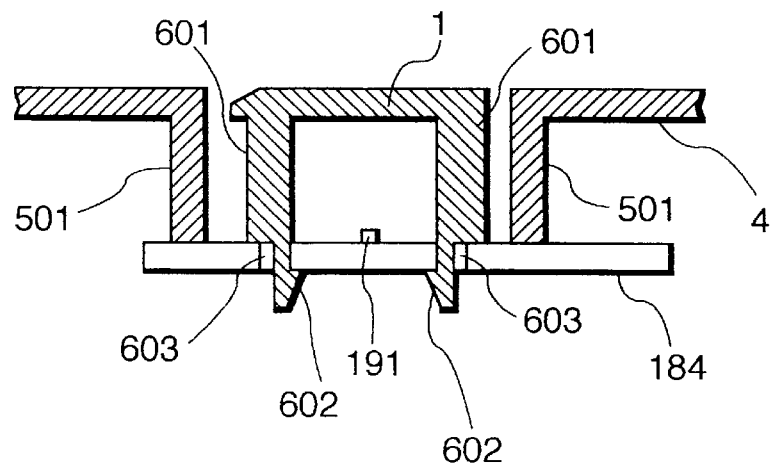
FIG. 13 is a diagrammatic, structural drawing for illustrating an example of the reading portion of the information processing apparatus of the present invention and surroundings thereof.
Figure 14:
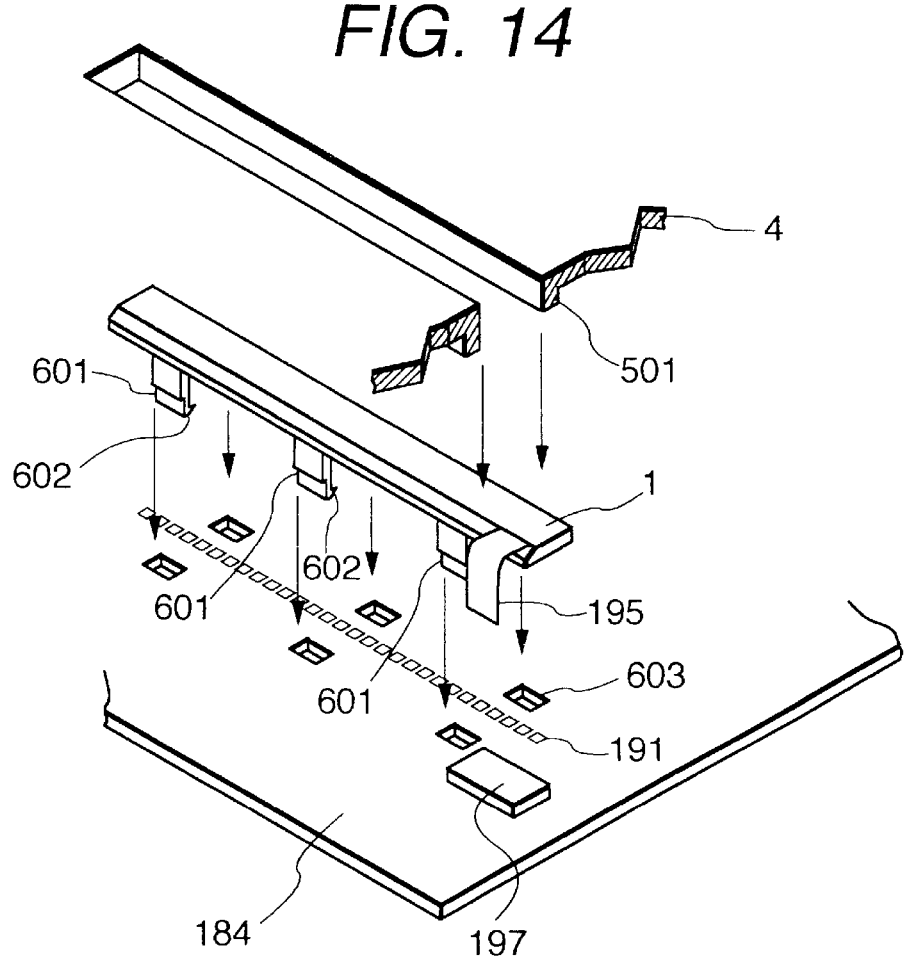
FIG. 14 is a diagrammatic, perspective, assembly drawing for illustrating an example of the reading portion of the information processing apparatus of the present invention and surroundings thereof.

FIG. 13 is a diagrammatic, structural drawing for illustrating another preferred example of the reading portion of the information processing apparatus of the present invention and surroundings thereof, and FIG. 14 a diagrammatic, perspective, assembly drawing thereof.

FIG. 13 and FIG. 14 show the example in which the light-source substrate is unified with the substrate for the other electric circuits in the same manner as in Embodiment 2. The present embodiment is, however, arranged to mount the photosensor 1 on the system control substrate 184 of the electric circuit substrate as well as the light sources 191.

Namely, the present embodiment is so constructed that the photosensor 1 is provided with projecting portions 601, projections 602 are provided at the lower ends of the respective projecting portions 601, and the projections 602 are hooked on the edges of holes 603 as being apertures formed in the system control substrate 184 to bring the photosensor 1 in fit with the system control substrate 184, thus unifying them with each other (which is a structure to unify members with each other by so-called snap fit).

The photosensor 1 is preferably formed by simultaneously molding the projecting portions 601 and projections 602 upon integral plastic molding of the sensor substrate and transparent protection layer. The simultaneous molding of the projecting portions 601 and projections 602 can further improve positioning accuracy with respect to the array of photoelectric conversion elements formed in the sensor substrate, which results in improving the mounting accuracy to the apparatus body.

Of course, the mounting of the photosensor 1 to the system control substrate 184 can be made firmer by further utilizing an adhesive, also using screwing, or further employing caulking.

Abutting between the frame 4 and the system control substrate 184 can be made as explained in Embodiment 2, and the lower ends of the framework 501 can be mounted to the system control substrate 184 by snap fit in the same manner as the mounting method between the photosensor 1 and the system control substrate 184 in the present embodiment.

Also in the present embodiment, the system control substrate 184 may be mounted in an inclined state by changing the lengths of the framework 501 as explained in Embodiment 2 and changing the lengths of the projecting portions 601.

The present embodiment can further improve the position accuracy of the photosensor 1 and the light sources 191 and can facilitate assembling. Since adjustment in light quantity of the light sources and adjustment in sensitivity of sensor can be performed in such a state that the photosensor and the light sources are mounted on the system control substrate 184, those adjustments become very easy and the total number of steps can be decreased, thereby further improving the work efficiency.

Although Embodiment 1 to Embodiment 3 as described above employed the urging means such as a spring provided on the conveying roller 183 side for achieving press contact between the photosensor 1 and the conveying roller 183, an elastic force of the frame 4 may be utilized as an urging force toward the conveying roller 183, utilizing the elastic force of the member forming the frame 4.

Embodiment 4

Figure 15:
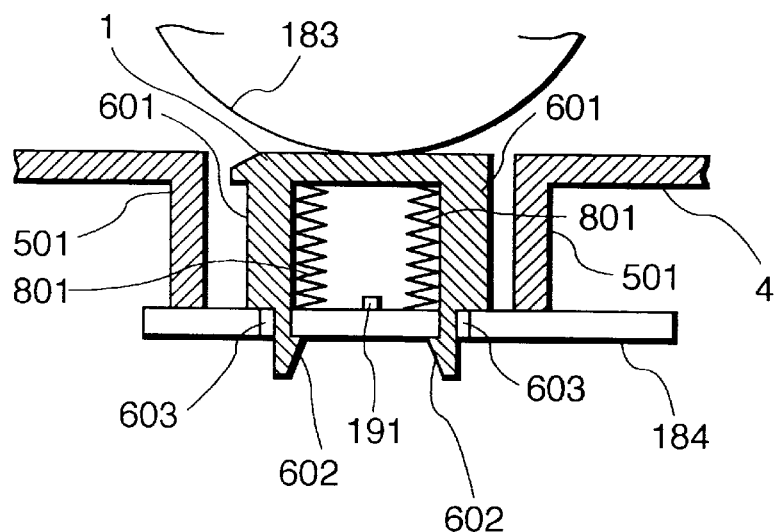
FIG. 15 is a diagrammatic, structural drawing for illustrating an example of the reading portion of the information processing apparatus of the present invention and surroundings thereof.
Figure 16:
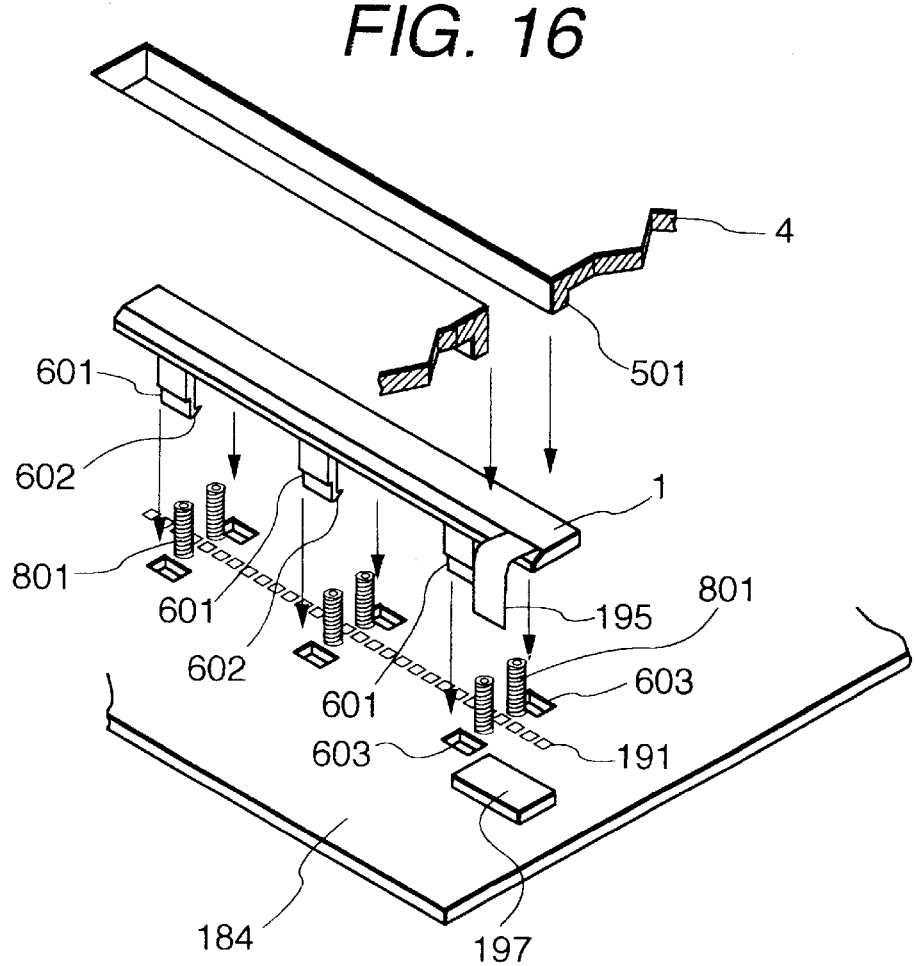
FIG. 16 is a diagrammatic, perspective, assembly drawing for illustrating an example of the reading portion of the information processing apparatus of the present invention and surroundings thereof.

FIG. 15 is a diagrammatic, structural drawing for illustrating another preferred example of the reading portion of the information processing apparatus of the present invention and surroundings thereof, and FIG. 16 is a diagrammatic, perspective, assembly drawing thereof.

In FIG. 15 and FIG. 16, similarly as in Embodiment 3, the light-source substrate is unified with the system control substrate 184 as being another electric circuit substrate, and projections 602 formed at the lower ends of projecting portions 601 provided for the photosensor 1 are hooked on at least parts of the peripheries of holes 603 as being apertures provided in the system control substrate 184, thus incorporating the photosensor 1 with the system control substrate 184.

In the present embodiment the photosensor 1 is provided with urging means 801 for urging the photosensor 1 toward the conveying roller 183. In order to enable the photosensor 1 urged toward the conveying roller by the urging means 801 to move to the light source side in the drawing when the photosensor 1 receives a force against the urging means 801, that is, in order to enable the photosensor urged by the urging means to move along the projecting portions as the photosensor pushes the conveying roller and the original is conveyed, the projecting portions 601 are slidably engaged with the system control substrate 184, and the length from portions of the projecting portions 601 where the system control substrate 184 is in contact with the side surfaces of the photosensor 1 to portions of the projections 602 where they are in contact with the system control substrate 184 is taken longer than the thickness of the system control substrate. The urging means 801 also have an effect to remove mounting play of the photosensor 1 to the system control substrate 184.

The present embodiment can absorb curvature or deformation of the system control substrate 184 by the urging means 801 such as springs in addition to the effects as explained in above Embodiment 3, thereby achieving further higher-resolution reading as well as the reductions of size and weight.

In particular, the present embodiment has an effect to obviate balancing by providing the urging means on the photosensor 1 side as compared with the case where the urging means is provided on the conveying roller 183 side. Namely, when the conveying roller 183 is urged, the pressing force often needs to be adjusted between sides with and without power transmitting means such as gears for driving the conveying roller 183; when the urging means is provided on the photosensor 1 side as in the present embodiment, such balancing of the urging force is unnecessary.

The present embodiment can solve the problem of oblique conveyance etc. by simple adjustment: the urging force is preferably adjusted so as to supply the strongest conveying force in the central portion of the conveying roller 183 in the longitudinal direction thereof in order to prevent the oblique conveyance of the original, which can be achieved for example by increasing the thickness of the center springs in the cases where the urging force is supplied from the photosensor 1 side as in the present embodiment.

Further, the present embodiment improves the tolerance zone for flatness of the photosensor 1 on the side of the conveying roller 183.

Although FIG. 16 showed the example in which the above urging means is coil springs, the urging means 801 does not have to be limited to this shape, but may be any urging means known as many springs or elastic members, for example elastic members such as plate springs, torsion springs, rubber, etc., balllike members having a gas such as air inside, etc.

The photosensor applicable in the present invention is not limited to the example as described above, but can be modified with necessity. Further, the photoelectric conversion elements applicable in the present invention are not limited to the structure of the photoelectric conversion elements as described above, either. However, a preferred arrangement of the photosensor is an elongate photosensor in which the photoelectric conversion elements are arranged throughout the entire length of the reading area.

The reading portion used in the information processing apparatus of the present invention is next explained by reference to the drawings.

Output methods that can be applied to the information processing apparatus etc. of the present invention include the thermal imprint recording method and the thermosensitive recording method using a thermal head, the ink jet recording method using an ink jet recording head, and the electrophotography.

Among these many methods, here is explained a structural example where an output part of the information processing apparatus is an output means of an ink jet recording head well decreased in size and weight, excellent in plain-paper recording, and low in running cost. The output part is mainly explained herein.

In the ink jet recording method, use of the recording head of a type utilizing thermal energy is more advantageous to the present invention. This is because the head itself can be made in a compact size and thus, the entire information processing apparatus can enjoy the effect of size reduction of the photoelectric conversion apparatus.

Typical construction and principle are preferably based, for example, on the basic principle as disclosed in the specifications of U.S. Pat. No. 4,723,129 and No. 4,740,796. This method can be applied to either one of the so-called on-demand type and continuous type; particularly, the method of the on-demand type is preferred because the size of the entire apparatus can be decreased.

Briefly explaining this method, at least one drive signal corresponding to recording information and giving a rapid temperature rise over nucleate boiling is applied to an electrothermal converter disposed corresponding to a sheet or a conduit holding a liquid (ink), whereby thermal energy is generated in the electrothermal converter to cause film boiling on a thermal action surface of the recording head, resulting in forming a bubble in the liquid in one-to-one correspondence to the recording signal. Based on growth and contraction of the bubble, the liquid is ejected through an ejection port to form at least one drop. Employing a pulsed form for the drive signal, the growth and contraction of bubble can be carried out immediately and appropriately, and ejection of liquid can be achieved particularly with excellent responsivity, which is more preferred.

Preferred examples of the pulsed drive signal are those as described in the specifications of U.S. Pat. No. 4,463,359 and No. 4,345,262. Further, more excellent recording can be performed by employing the conditions as described in the specification of U.S. Pat. No. 4,313,124, which describes the invention as to the temperature rise rate of the above thermal action surface.

Specific examples applicable to the structure of the recording head include the structures of a combination of ejection ports, conduits, and electrothermal converters (including linear conduits or conduits having bent portions) as described in the above specifications, and the structures using the specifications of U.S. Pat. No. 4,558,333 and No. 4,459,600 disclosing the structures in which the thermal action surface is disposed in a curved region.

In addition, other effective structures are those based on the bulletin of Japanese Laid-open Patent Application No. 59-123670 disclosing the structure having a common slit as an ejecting portion of liquid and the bulletin of Japanese Laid-open Patent Application No. 59-138461 disclosing the structure to correspond apertures for absorbing pressure waves of thermal energy to the ejecting portion.

Further, the recording head may be one of a full-line type having the length corresponding to the width of a maximum recording medium which the recording apparatus can record. In this case, the recording head may be constructed to fill the length by a combination of plural recording heads or by only one recording head integrally formed, as described in the above specifications.

Additionally, preferred examples of the recording head include an interchangeable chip-type recording head which can complete electric connection with the apparatus body and supply of ink from the apparatus body when mounted on the apparatus body, and a recording head of a cartridge type in which electric connections and an ink tank are incorporated.

Addition of recovery unit, preparatory assisting unit, etc. to the recording head provided as a constituent of the information processing apparatus of the present invention is preferred in order to realize further progress of maintenance free arrangement.

Specifically describing those units, effective means to stable recording are capping means, cleaning means, and pressurizing or sucking means for the recording head, heating means such as an electrothermal converter for heating the recording head, and possession of a preparatory ejection mode for effecting ejection other than recording.

Further, examples of recording mode may include a recording mode only by a main color such as black, and a recording mode with different multiple colors or full colors by an integrally formed recording head or a combination of plural recording heads.

The above description concerned examples with liquid (ink), but the ink may be a solid ink that is solid at room temperature or an ink that becomes softened at room temperature. Since the above ink jet method normally includes such temperature control that the viscosity of ink is kept in a stable ejection range by temperature adjustment of the ink itself in the range of 30° C. to 70° C., the ink may be one that is liquid when a recording signal used is supplied. In addition, the ink may be one that is used in a liquid state after changed from a solid state by a positive temperature rise with thermal energy.

Next explained briefly is an ink jet recording head used in the method of performing recording with ejection of liquid utilizing the thermal energy as described.

Figure 17:
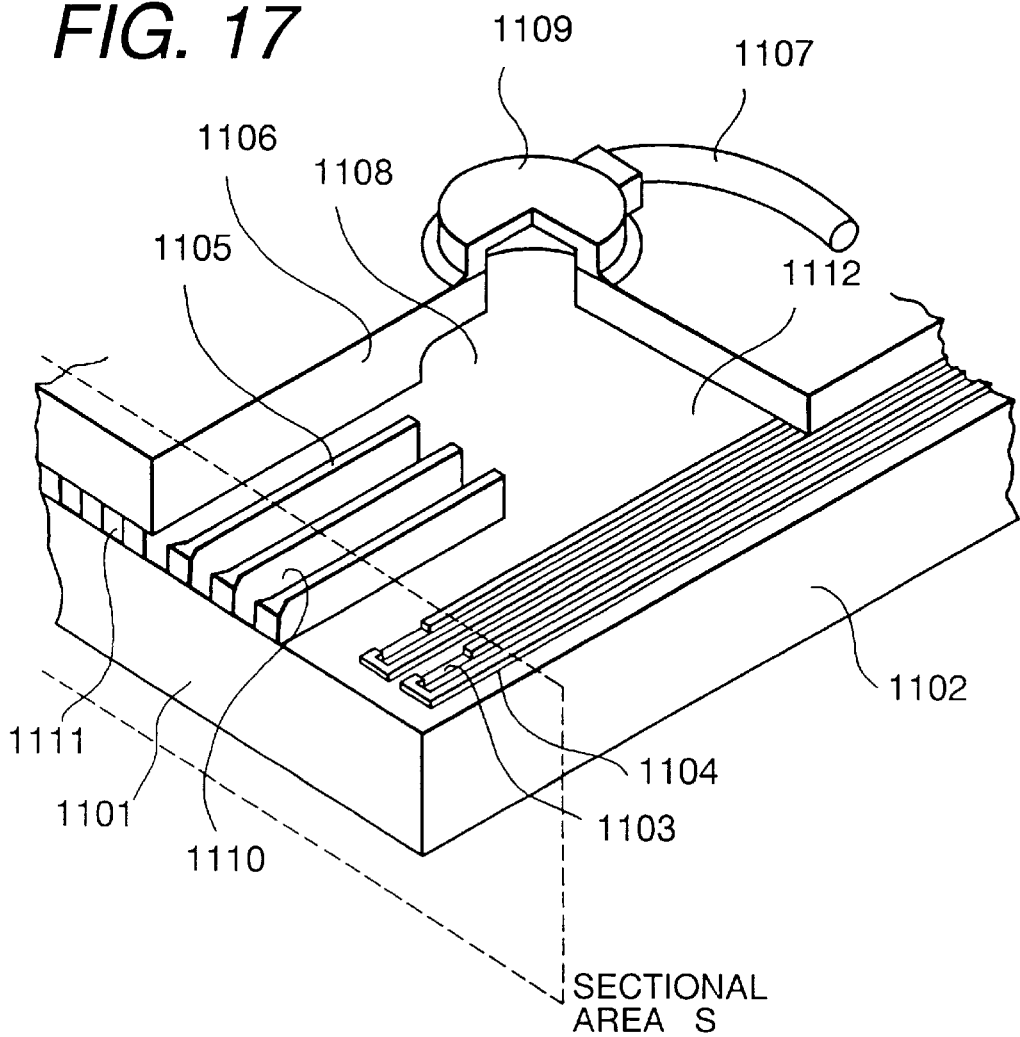
FIG. 17 is a diagrammatic, perspective view for illustrating an example of an ink jet recording head applicable to the information processing apparatus of the present invention.

FIG. 17 is a schematic, structural drawing for illustrating an example of the ink jet recording head, showing an ink jet recording head comprised of electrothermal converters 1103, electrodes 1104, conduits 1105, and a top plate 1106 film-formed on a substrate 1102 through steps of semiconductor fabrication process including etching, vapor deposition, sputtering, etc. A liquid 1112 for recording is supplied from a liquid reservoir not shown through a liquid supply pipe 1107 to a common liquid chamber 1108 in the recording head 1101. In the drawing, reference numeral 1109 designates a connector for liquid supply pipe.

The liquid 1112 supplied into the common liquid chamber 1108 is then supplied into the conduits 1110 by the so-called capillarity, and forms a meniscus on a surface of an ejection port (orifice) at the fore end of each conduit, thereby being held stably When a current is supplied to an electrothermal converter 1103, the liquid in the electrothermal converter is quickly heated to produce a bubble in the conduit, and expansion and contraction of the bubble ejects the liquid through the ejection port 1111 to form a liquid drop.

According to the above arrangement, the ink jet head can be formed in a high-density port array with a density of ejection ports being 16 nozzles/mm or more, as including 128 ejection ports or 256 ejection ports, or the ink jet head may be formed in the so-called full-line type in which the ejection ports are aligned throughout the entire recording width.

Figure 18:
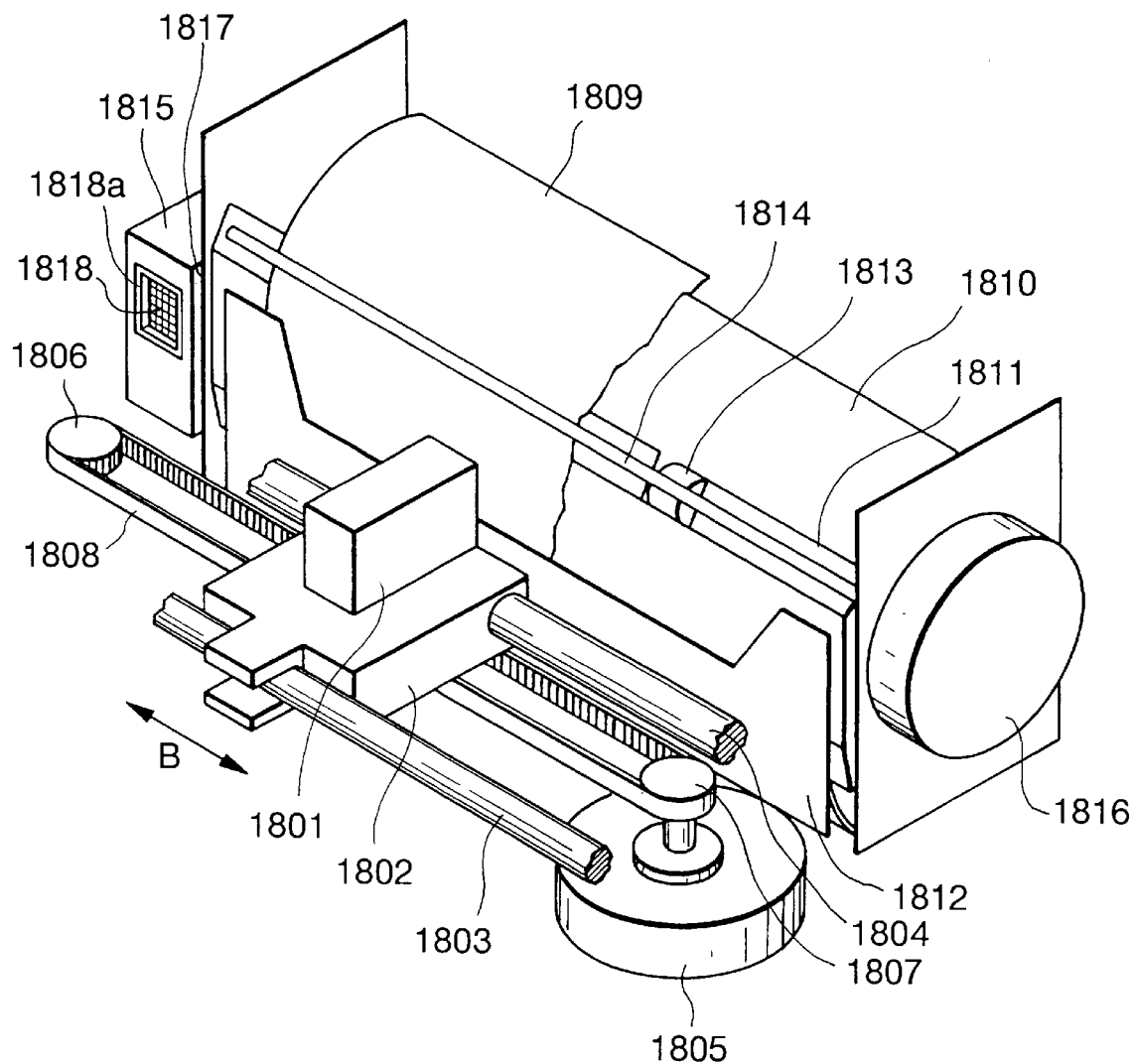
FIG. 18 is a diagrammatic, perspective view of an example of a recording portion using the ink jet recording method, applicable to the information processing apparatus of the present invention.

FIG. 18 is a perspective view to show the scheme of external structure of the output portion using the ink jet recording method.

In the drawing, numeral 1801 denotes the ink jet recording head (hereinafter referred to as a recording head) for recording a desired image by ejecting the ink, based on a predetermined recording signal, and 1802 a carriage for scan-moving the recording head 1801 in a recording direction (main scan direction). The carriage 1802 is slidably supported by guide shafts 1803, 1804 and translationally moves in the main scan direction in synchronization with a timing belt 1808. The timing belt 1808 engaged with pulleys 1806, 1807 is driven by a carriage motor 1805 through the pulley 1807.

A recording sheet 1809 is guided by a paper pan 1810 and is conveyed by an unrepresented sheet feeding roller by a pinch roller in press contact therewith.

A sheet feeding motor 1816 is used as a drive source for this conveyance. The recording sheet 1809 conveyed is given a tension by a sheet discharging roller 1813 and a spur 1814 and is conveyed as being kept in close contact with a heater 1811 by a sheet stopper 1812 made of an elastic member. The recording sheet 1809 on which the ink ejected by the recording head 1801 is deposited is heated by the heater 1811, whereby the ink deposited is fixed on the recording sheet 1809 as evaporating water.

Numeral 1815 denotes a unit called as a recovery system, which is for maintaining ejection characteristics in a normal state by removing a foreign substance or viscosity-increased ink deposited on the discharge ports (not shown) of the recording head 1801.

Numeral 1818a is a cap forming a part of the recovery system 1815, which is for preventing occurrence of plugging by capping the ejection ports of the recording head 1801. It is preferred to set an ink absorber 1818 inside the cap 1818a.

Disposed on the recording area side of the recovery system 1815 is a blade 1817 arranged to come in contact with the surface on which the ejection ports of the recording head 1801 are formed, so as to clean the foreign substance or ink deposited on the surface of ejection ports.

Figure 20:
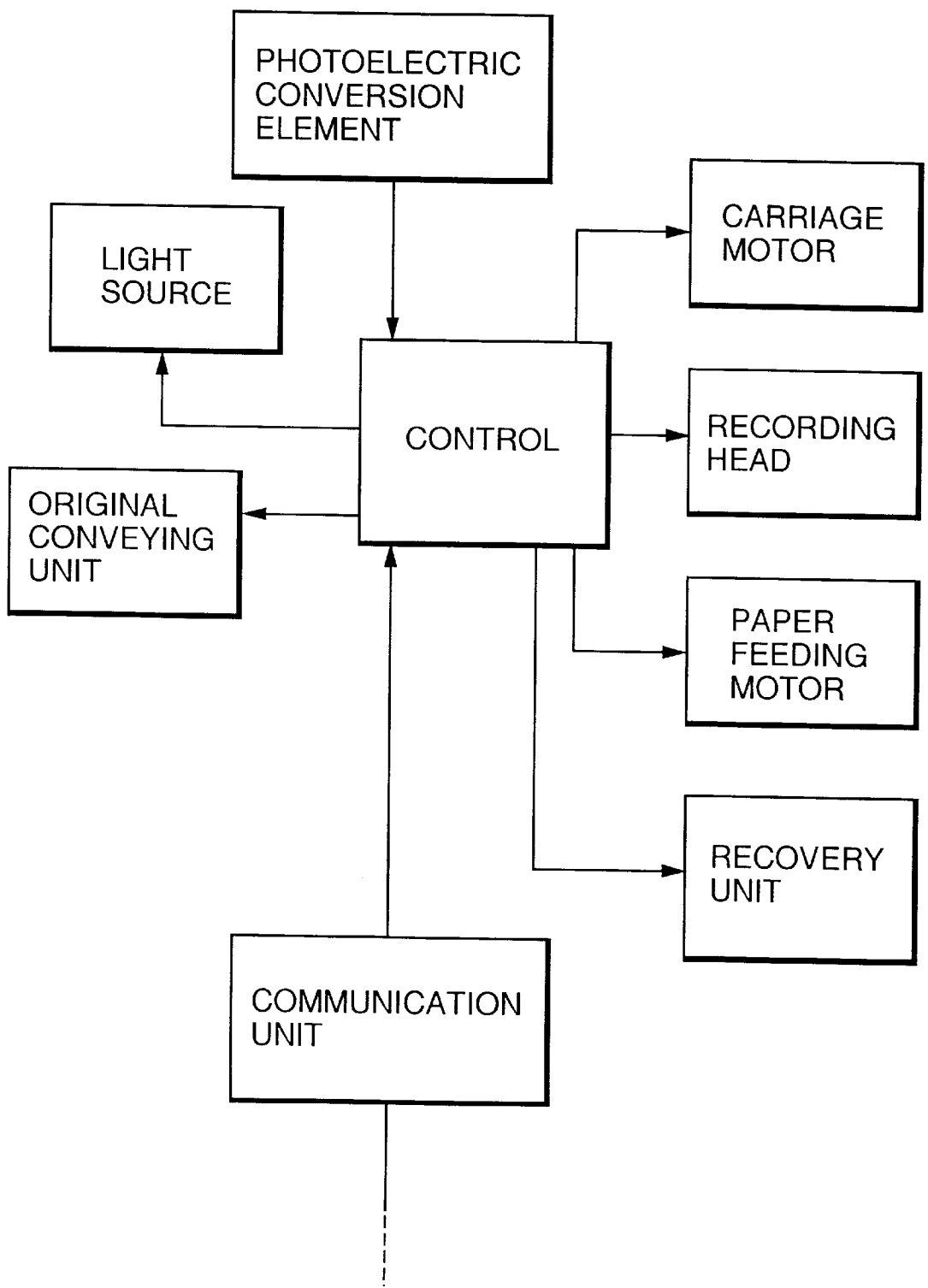
FIG. 20 is a block structural drawing for illustrating an example of the construction of the information processing apparatus of the present invention.

In the present invention, recording is carried out, as shown in the block diagram of FIG. 20, by converting an electric signal carrying image information read by the photoelectric conversion apparatus into an electric signal for recording by image processing means and controlling the carriage motor, sheet feeding motor, recovery unit, etc. by a controller such as a CPU (central processing unit).

The electric signal carrying the image information may be transmitted through a communication unit to another image processing apparatus and be output there, or information may be received through the communication unit from another information processing apparatus and be recorded by the above recording head.

Figure 19:
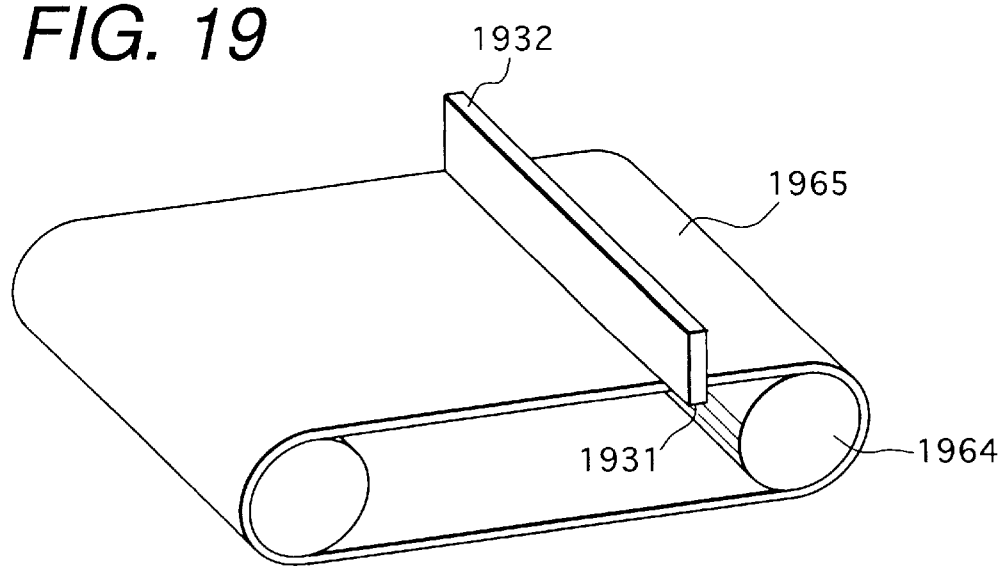
FIG. 19 is a diagrammatic, perspective view of an example of the recording portion using the ink jet recording method, applicable to the information processing apparatus of the present invention.

Next, FIG. 19 shows the scheme of the output portion where the recording head 1932 of the full-line type is mounted.

In FIG. 19, numeral 1965 is a conveying belt for conveying a recording medium, and this conveying belt 1965 conveys a recording medium not shown with rotation of a conveying roller 1964. The bottom surface of the recording head 1932 is an ejection port surface 1931 in which a plurality of ejection ports are arranged in correspondence to the recording area of the recording medium.

In this case recording can also be performed in the same manner as in the case of the serial type as described above.

Of course, the above output portion is explained as an example, and there are a lot of modifications thereof.

However, when the method for ejecting the liquid utilizing the thermal energy as described above is used, the apparatus can be constructed in a smaller size and can perform high-resolution recording, thereby much more enhancing the effects of the present invention and making the total information processing apparatus extremely excellent.

As explained above, the present invention can realize further reductions of the size and weight, can decrease the number of constituent components in the total apparatus, can decrease the cost including the production cost, and can further improve the reliability. Further, the present invention can further improve the freedom of design.

Since the components can be mounted on the frame of the apparatus body in a moderately concentrated form like the photosensor and the light-source substrate, a component or components necessitating exchange can be changed in a small and easily exchangeable unit without changing components not necessitating exchange.

In addition, the present invention involves a unified substrate in which the light-source substrate with a light source such as LEDs, an incandescent lamp such as a halogen lamp, or a discharge tube such as a xenon tube or a fluorescent tube is unified with the electric circuit substrate in which apparatus-side electric circuits such as the system controller of apparatus are incorporated, and thus, the present invention can realize a further reduction in the number of components, a further reduction in the number of assembling steps, and a further reduction in the number of wiring connections, thereby further more improving the reliability.

Further, the unification of the light-source substrate with the electric circuit substrate can further decrease the size and weight and can achieve a more improvement in the freedom of design.

In addition, the hooking arrangement of the photosensor with the electric circuit substrate having the light sources can further improve the positioning accuracy between them, and can facilitate adjustment in light quantity of the light sources and adjustment in sensitivity of photosensor. Further, the present invention can further decrease the number of assembling steps as a whole, and can further improve productivity including the work efficiency.

The present invention can also further decrease the number of components by achieving contact between the photosensor and the conveying roller utilizing the elastic force of the frame and can overcome the problem of occurrence of oblique conveyance by setting the urging means for urging the photosensor toward the conveying roller.

Additionally, the present invention can provide the photoelectric conversion apparatus and information processing apparatus that can perform stable image reading.

It should be noted that the present invention is by no means intended to be limited to the above embodiments and drawings, but they may be properly modified or combined within the scope of the essence of the present invention.

What is claimed is:

1. An information processing apparatus comprising:
   a controller;
   a light source substrate on which a light source and said controller are arranged, said light source substrate functioning as a system control substrate for said information processing apparatus;
   a photoelectric conversion device having plural photoelectric conversion elements and an optically transparent substrate on which said photoelectric conversion elements are arranged, wherein said photoelectric conversion device has a protruding portion structured so as to be joined with said light source substrate, and, through said protruding portion, said light source substrate is engaged with said photoelectric conversion device;

a frame constituting an original conveying surface, said light source substrate being mounted on said frame; and conveying means for conveying an original, wherein said controller controls at least one of said light source, said photoelectric conversion device and said conveying means.

2. The information processing apparatus according to claim 1, further comprising an output portion for recording an image according to an electric signal corresponding to image information.

3. The information processing apparatus according to claim 2, wherein said output portion has a thermal head.

4. The information processing apparatus according to claim 2, wherein said output portion has an ink jet recording head.

5. The information processing apparatus according to claim 4, wherein said ink jet recording head has an electrothermal converter for generating thermal energy for forming a bubble for ejecting an ink.

6. The information processing apparatus according to claim 4, which has recovery means for recovering a failure in ejection of said ink jet recording head.

7. The information processing apparatus according to claim 4, which has cleaning means for cleaning said ink jet recording head.

8. The information processing apparatus according to claim 7, wherein said cleaning means has a cleaning blade.

9. The information processing apparatus according to claim 4, which has capping means for capping said ink jet recording head.

10. The information processing apparatus according to claim 9, wherein said capping means has an ink absorber.

11. The information processing apparatus according to claim 4, wherein said ink jet recording head is a full-line head.

12. The information processing apparatus according to claim 2, further comprising a heater for heating a member recorded.

13. The information processing apparatus according to claim 1, wherein said light source substrate is joined with said protruding portion by snap fitting.

14. The information processing apparatus according to claim 1, wherein an aperture is formed in said light source substrate, and said protruding portion is inserted therein.

15. The information processing apparatus according to claim 1, wherein said protruding portion further comprises a protrusion structured so as to be engaged with said light source substrate.

16. The information processing apparatus according to claim 1, wherein said protruding portion extends entirely through said light source substrate such that a length of said protruding portion from a point of said protruding portion at one side of said light source substrate to another point of said protruding portion at an opposite side of said light source substrate is longer than a thickness of said light source substrate.

17. The information processing apparatus according to claim 1, wherein said protruding portion comprises a protrusion for contacting with a surface of said light source substrate at a side opposite to said photoelectric conversion elements, and said protrusion comprises urging means for urging in a direction toward a surface of said light source substrate.

18. The information processing apparatus according to claim 17, wherein said urging means is a spring or an elastic member.

19. The information processing apparatus according to claim 1, wherein said light source substrate is an electric circuit board having said controller.

20. The information processing apparatus according to claim 1, further comprising a frame protrusion in a direction opposite to said original conveying surface to engage said frame with said light source substrate.

21. The information processing apparatus according to claim 1, wherein said frame constitutes at least a part of a frame of the main body of said information processing apparatus.

22. The information processing apparatus according to claim 1, wherein said frame is used at least as a part of said urging means for urging said photosensor toward said original conveying means.

23. An information processing apparatus comprising:

a light source substrate on which a light source is arranged;

a photoelectric conversion device having plural photoelectric conversion elements and an optically transparent substrate on which said photoelectric conversion elements are arranged;

a frame constituting an original conveying surface, said frame having a section for mounting said light source substrate independently of said photoelectric conversion device, said frame further having a joining section for joining said frame with said photoelectric conversion device independently of said light source substrate;

conveying means for conveying an original; and a controller for controlling at least one of said light source, said photoelectric conversion device and said conveying means.

24. The information processing apparatus according to claim 23, further comprising an output portion for recording an image according to an electric signal corresponding to image information.

25. The information processing apparatus according to claim 24, wherein said output portion has a thermal head.

26. The information processing apparatus according to claim 24, wherein said output portion has an ink jet recording head.

27. The information processing apparatus according to claim 26, wherein said ink jet recording head has an electrothermal converter for generating thermal energy for forming a bubble for ejecting an ink.

28. The information processing apparatus according to claim 26, which has recovery means for recovering a failure in ejection of said ink jet recording head.

29. The information processing apparatus according to claim 26, which has cleaning means for cleaning said ink jet recording head.

30. The information processing apparatus according to claim 29, wherein said cleaning means has a cleaning blade.

31. The information processing apparatus according to claim 26, which has capping means for capping said ink jet recording head.

32. The information processing apparatus according to claim 31, wherein said capping means has an ink absorber.

33. The information processing apparatus according to claim 26, further comprising a heater for heating a member recorded.

34. The information processing apparatus according to claim 26, wherein said ink jet recording head is a full-line head.

35. The information processing apparatus according to claim 23, wherein said frame has a concave portion opposing the original conveying surface, and said light source substrate is structured to be placed on a bottom of the concave portion.

36. The information processing apparatus according to claim 23, wherein said frame has an aperture, and has the joining portion for engaging said photoelectric conversion device corresponding to the aperture.

37. The information processing apparatus according to claim 23, wherein said frame has an aperture and a frame protrusion extending from a periphery of the aperture toward an opposite side to said original conveying surface.

38. The information processing apparatus according to claim 37, wherein said frame protrusion is in contact with said light source substrate.

39. The information processing apparatus according to claim 38, wherein said frame protrusion is engaged with said light source substrate.

40. The information processing apparatus according claim 23, wherein said frame and said photoelectric conversion device are press-fitted through said joining section.

41. The information processing apparatus according to claim 23, wherein said photoelectric conversion device is provided at a periphery of said light source substrate, and has a mounting member constituting a section for mounting said photoelectric conversion device.

42. The information processing apparatus according to claim 23, wherein said photoelectric conversion device has a projecting portion or a cut portion structured so as to be engaged with said joining portion.

43. The information processing apparatus according to claim 23, wherein said frame constitutes at least a part of a frame of a main body of said information processing apparatus.

44. The information processing apparatus according to claim 23, wherein said frame is used at least as urging means for urging said photoelectric conversion device toward said original conveying means.

* * * * *

UNITED STATES PATENT AND TRADEMARK OFFICE
CERTIFICATE OF CORRECTION

PATENT NO.    : 5,900,622
DATED         : May 4, 1999
INVENTOR(S)   : MAKOTO OGURA, ET AL.

It is certified that error appears in the above-identified patent and that said Letters Patent is hereby corrected as shown below:

COLUMN 1

Line 45, "original" should read --original.--

COLUMN 3

Line 18, "thereof" should read --thereof.--.

COLUMN 7

Line 13, "original" should read --original.--; and
    Line 18, "adjustment" should read --adjustment.--.

COLUMN 10

Line 9, "necessary" should read --necessary.--.

UNITED STATES PATENT AND TRADEMARK OFFICE
CERTIFICATE OF CORRECTION

PATENT NO. : 5,900,622
DATED : May 4, 1999
INVENTOR(S) : MAKOTO OGURA, ET AL.

Page 2 of 2

It is certified that error appears in the above-identified patent and that said Letters Patent is hereby corrected as shown below:

COLUMN 14

Line 53, "stably" should read --stably.--.

Signed and Sealed this

Eleventh Day of January, 2000

Attest:

Q. TODD DICKINSON

Attesting Officer

Acting Commissioner of Patents and Trademarks